(12) United States Patent
Wilson

(10) Patent No.: US 12,436,057 B2
(45) Date of Patent: Oct. 7, 2025

(54) FORCED AIR LEAKAGE TESTING ASSEMBLY

(71) Applicant: Zachery Wilson, Louisville, KY (US)

(72) Inventor: Zachery Wilson, Louisville, KY (US)

(*) Notice: Subject to any disclaimer, the term of this patent is extended or adjusted under 35 U.S.C. 154(b) by 320 days.

(21) Appl. No.: 18/229,745

(22) Filed: Aug. 3, 2023

(65) Prior Publication Data
US 2025/0044178 A1 Feb. 6, 2025

(51) Int. Cl.
G01M 3/14 (2006.01)
F24F 7/007 (2006.01)

(52) U.S. Cl.
CPC .............. G01M 3/14 (2013.01); F24F 7/007 (2013.01)

(58) Field of Classification Search
CPC .................................. G01M 3/14; F24F 7/007
See application file for complete search history.

(56) References Cited

U.S. PATENT DOCUMENTS

| 4,363,236 | A | 12/1982 | Meyers | |
|---|---|---|---|---|
| 5,780,722 | A | 7/1998 | Kovacs | |
| 5,861,546 | A * | 1/1999 | Sagi | G01F 7/005 137/599.13 |
| 5,866,802 | A * | 2/1999 | Kimata | G01M 3/2815 431/12 |
| 6,854,318 | B2 * | 2/2005 | Sagi | G01M 3/3254 73/40 |
| 8,757,008 | B1 | 6/2014 | Nelson | |
| 10,697,849 | B2 | 6/2020 | Mizrahi | |
| D963,834 | S | 9/2022 | Daniels | |
| 2011/0179854 | A1 * | 7/2011 | Brooks | G01M 3/20 73/40.7 |
| 2013/0305814 | A1 | 11/2013 | Menez | |
| 2015/0073732 | A1 * | 3/2015 | Lee | F24F 7/007 702/50 |
| 2022/0187154 | A1 | 6/2022 | Deladurantaye | |

FOREIGN PATENT DOCUMENTS

WO    WO2012069761    5/2012

* cited by examiner

Primary Examiner — Francis C Gray

(57) ABSTRACT

A forced air leakage testing assembly includes a plurality of intake covers that can each be fitted over an air intake of a respective type of air handler of a forced air heating and cooling system. A flange is attachable to a respective one of the plurality of intake covers and the flange is attachable to an exhaust hose of a source of forced air to direct forced air into the air intake over which the respective intake cover is positioned. A plurality of register covers is each positionable over a respective air register thereby inhibiting air from flowing through the respective air register. A balloon is inflatable to seal a floor register when the balloon is inserted into the floor register and inflated thereby inhibiting air from exiting the floor register.

14 Claims, 17 Drawing Sheets

FORCED AIR LEAKAGE TESTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to leakage testing devices and more particularly pertains to a new leakage testing device for performing a leakage test on a forced air heating and cooling system. The device includes a plurality of intake covers that can each be fitted to a respective type of intake on an air handler and a plurality of register covers that can each be fitted to a respective air register. The device includes a flange that is attachable to a respective intake cover to facilitate an air duct of a source of forced air to be attached to the flange for performing a leakage test on the forced air heating and cooling system. The device includes a balloon that can be inserted into a floor register and inflated to close off the floor register.

(2) Description of Related Art Including Information Disclosed Under 37 CFR 1.97 and 1.98

The prior art relates to leakage testing devices including a variety of vessel pressurization devices that each includes a blower and either a plenum or a duct that is specifically designed to be coupled between the blower and a vessel for performing a leakage test on the vessel. In no instance does the prior art disclose a leakage test device that includes a plurality of intake panels that can be fitted to a respective intake of an air handler and a plurality of register covers and a flange that is removably attachable to a respective intake panel which is attachable to a duct of a source of forced air for performing a leakage test on a forced air heating and cooling system.

BRIEF SUMMARY OF THE INVENTION

An embodiment of the disclosure meets the needs presented above by generally comprising a plurality of intake covers that can each be fitted over an air intake of a respective type of air handler of a forced air heating and cooling system. A flange is attachable to a respective one of the plurality of intake covers and the flange is attachable to an exhaust hose of a source of forced air to direct forced air into the air intake over which the respective intake cover is positioned. A plurality of register covers is each positionable over a respective air register thereby inhibiting air from flowing through the respective air register. A balloon is inflatable to seal a floor register when the balloon is inserted into the floor register and inflated thereby inhibiting air from exiting the floor register.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 11:
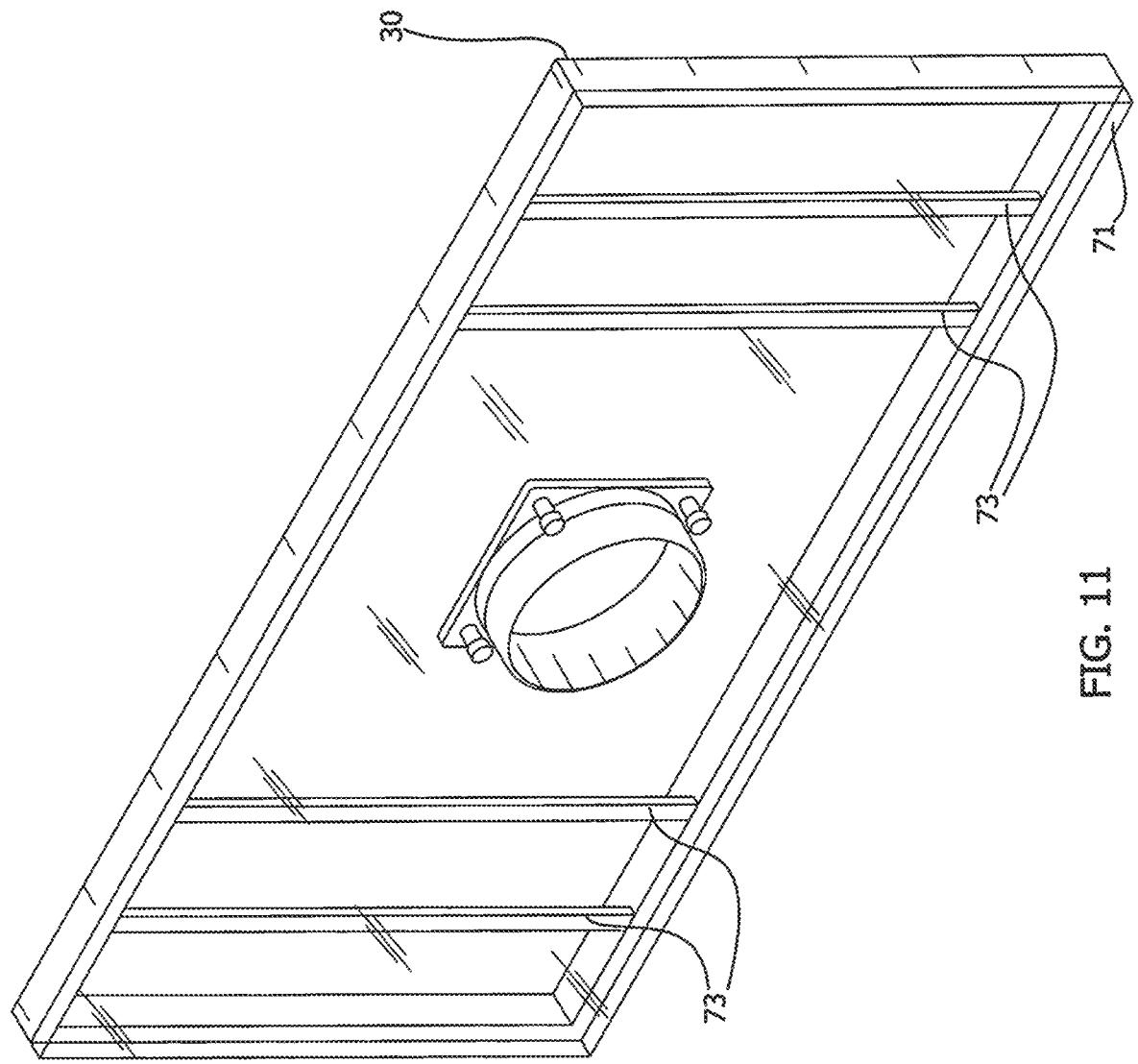

FIG. 11 a front perspective view of a second intake cover of an embodiment of the disclosure.

Figure 12:
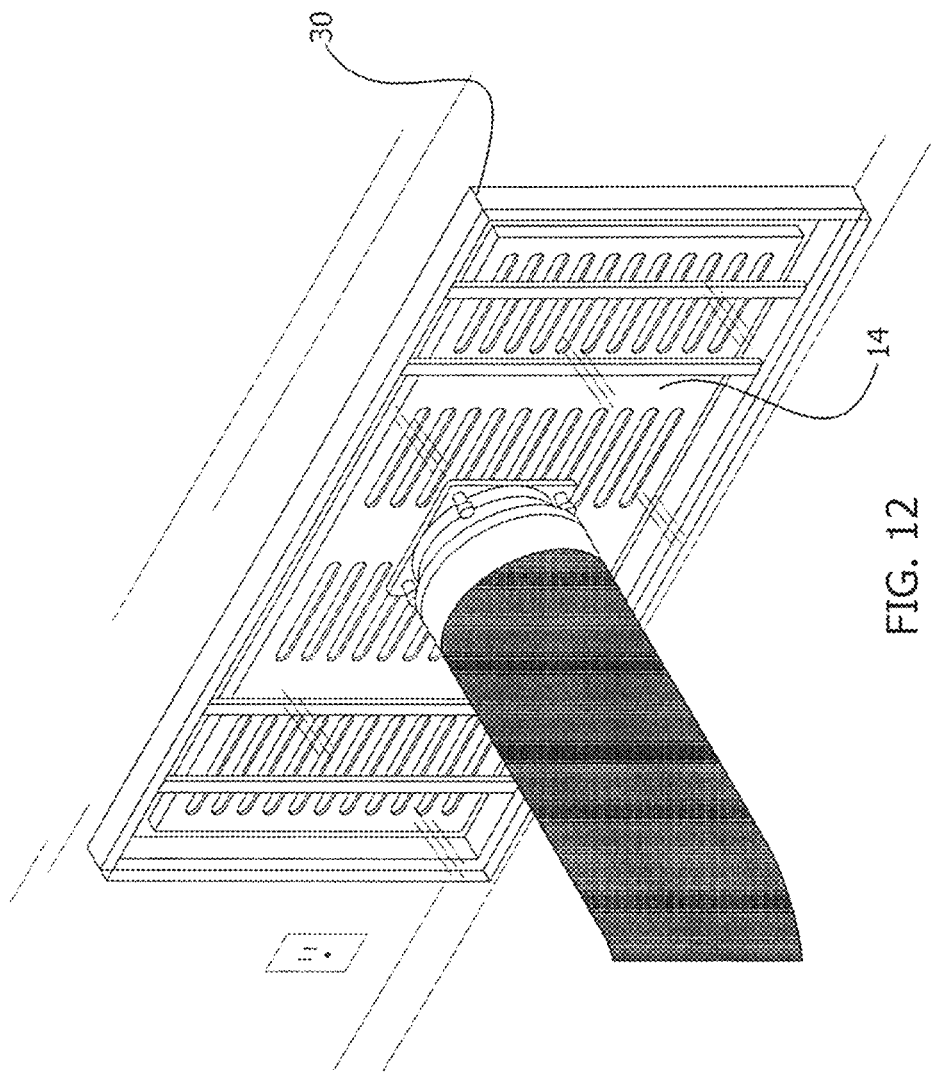

FIG. 12 is a perspective in-use view of an embodiment of the disclosure showing a second intake cover being fitted to an air intake.

Figure 13:
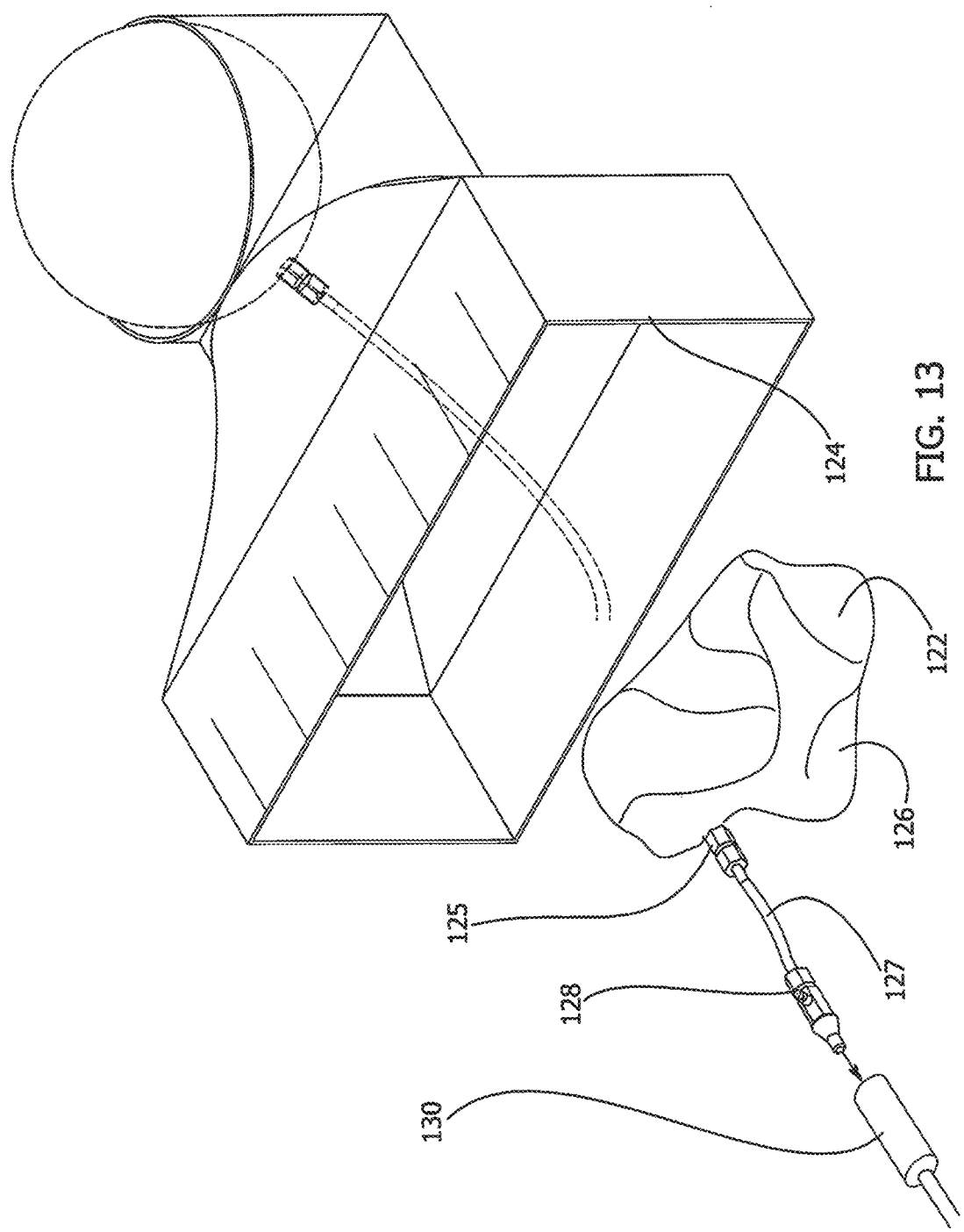

FIG. 13 is a perspective in-use view of an embodiment of the disclosure showing a balloon being inserted into a floor register.

Figure 14:
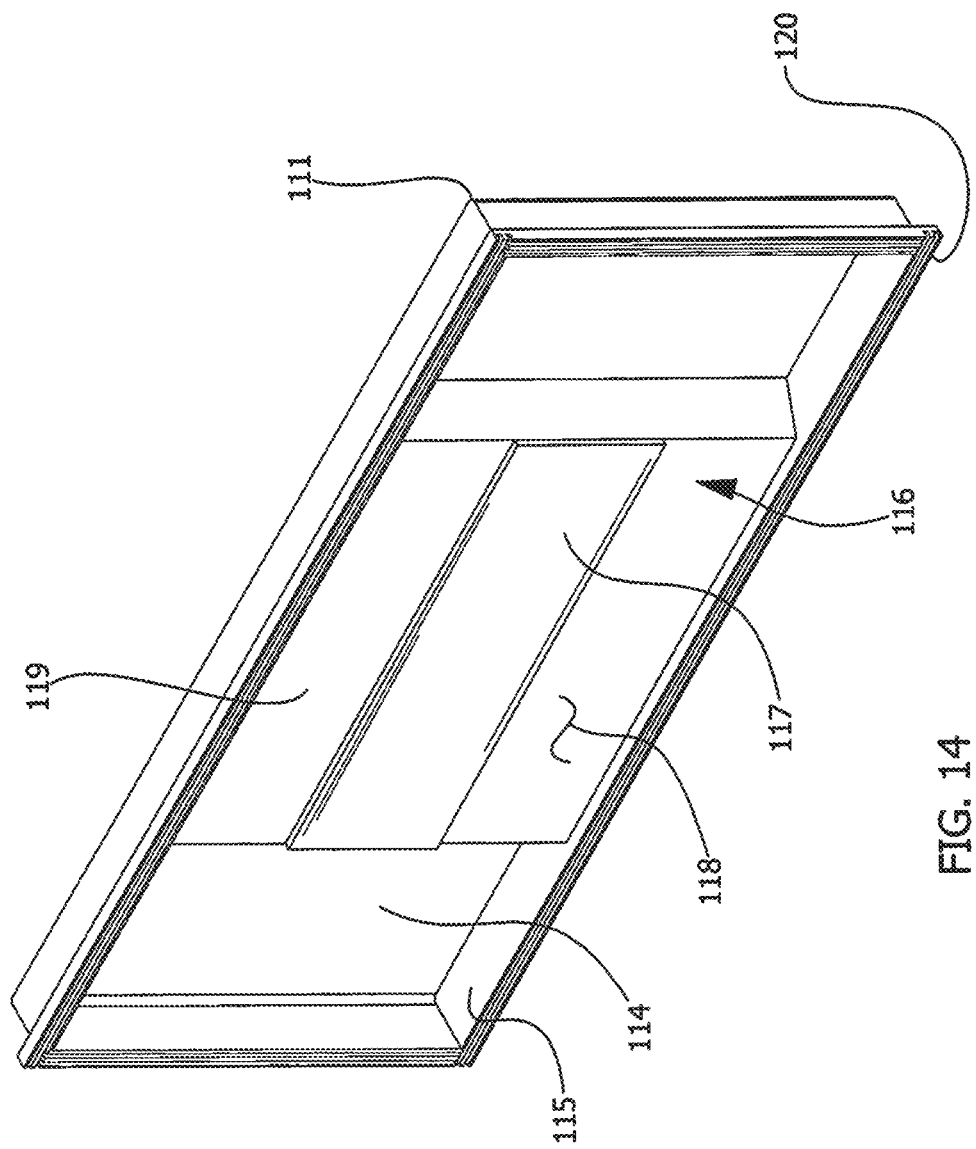

FIG. 14 is a back perspective view of a register cover of an embodiment of the disclosure.

Figure 15:
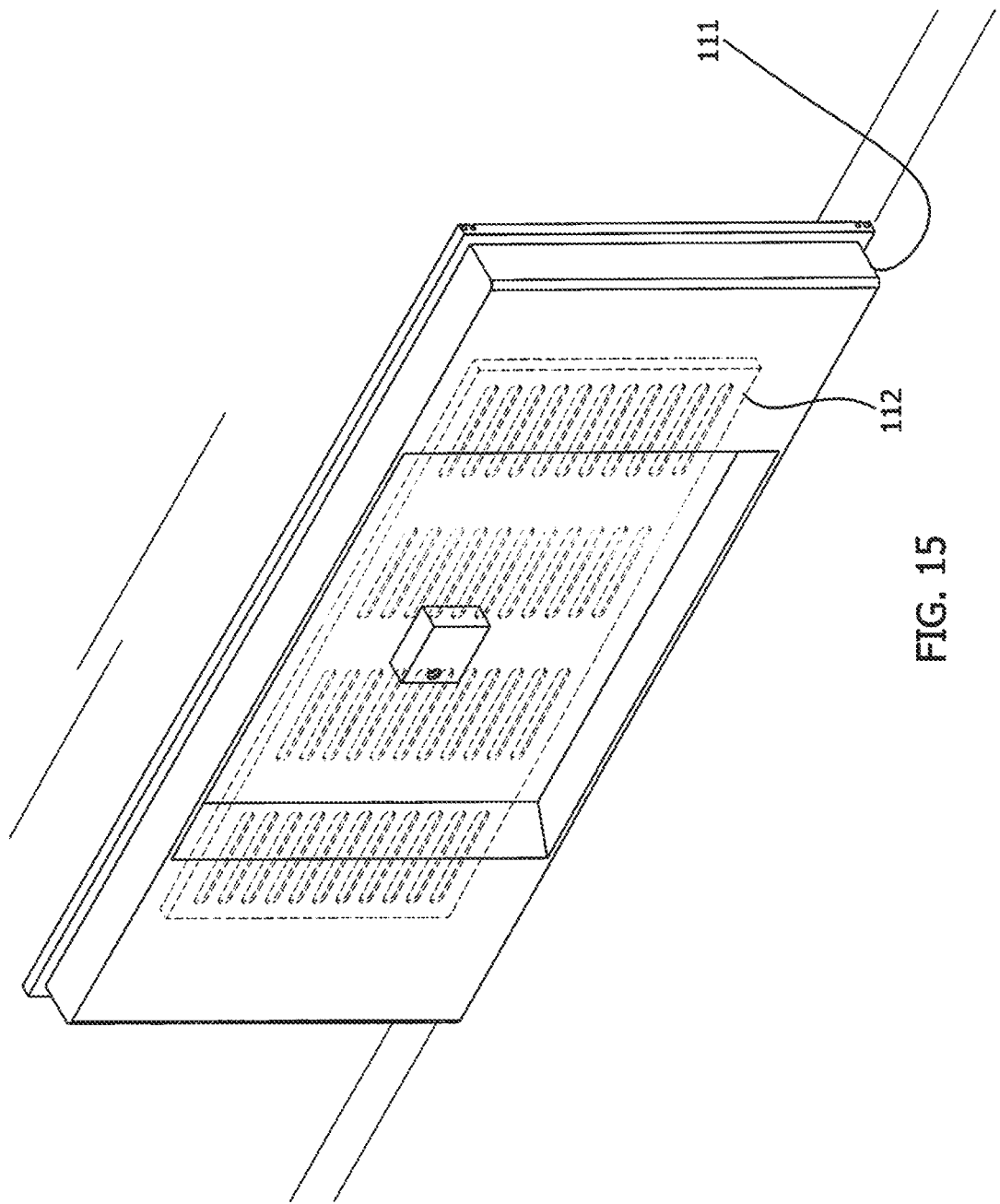

FIG. 15 is a perspective in-use view of an embodiment of the disclosure showing a register cover being fitted to an air register.

Figure 16:
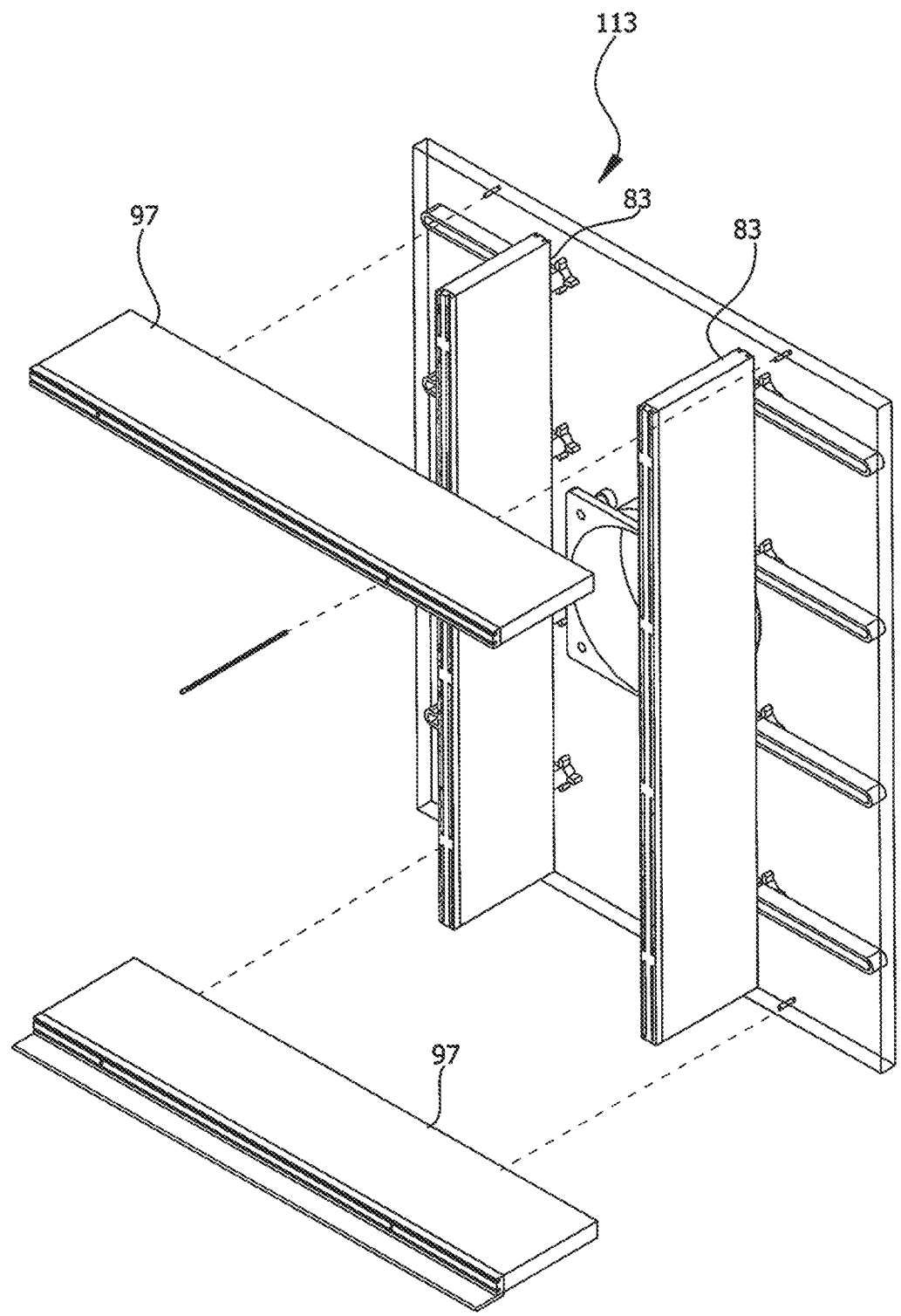

FIG. 16 is a perspective view of an alternative embodiment of the disclosure.

Figure 1:
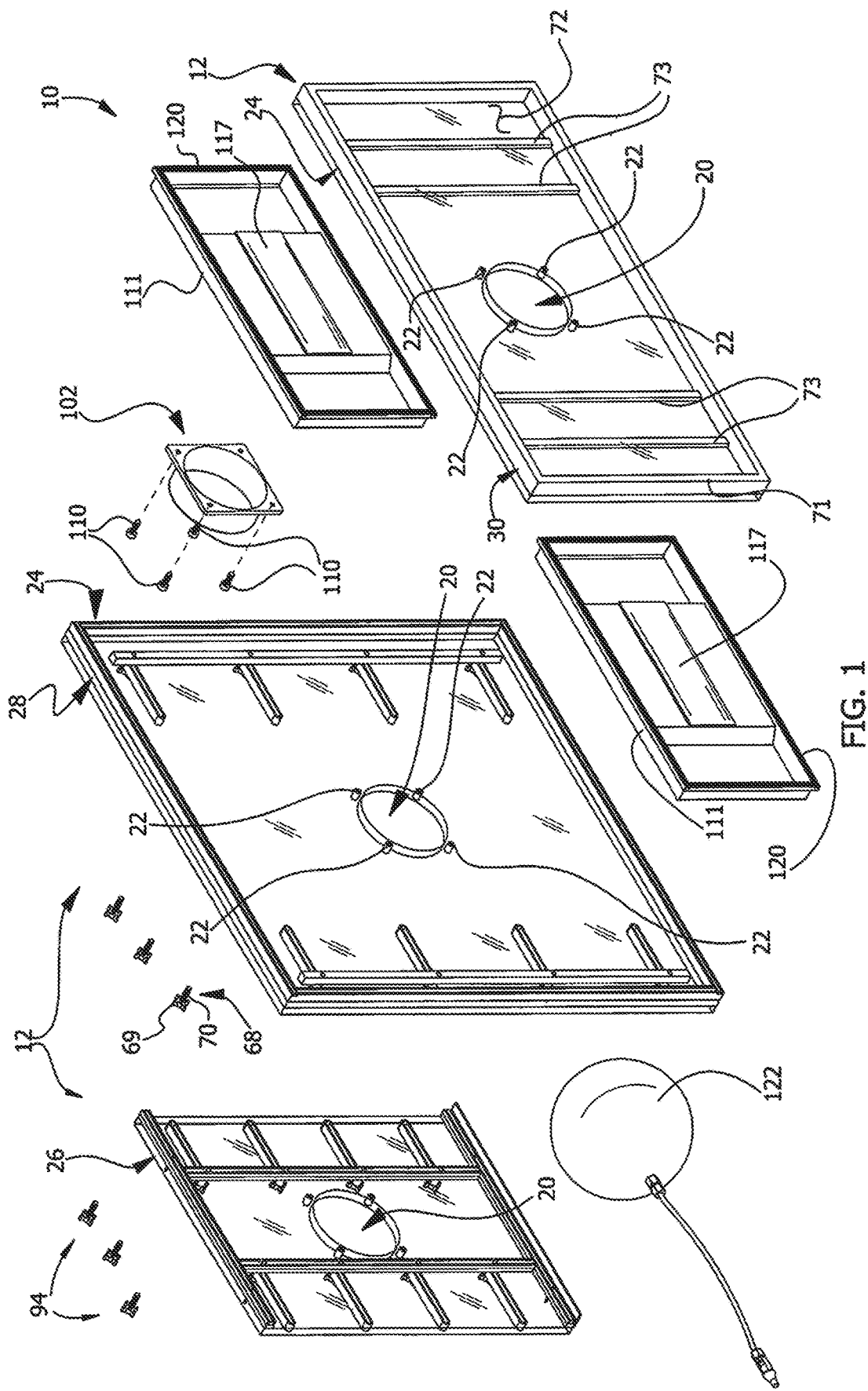
FIG. 1 is a perspective view of a forced air leakage testing assembly according to an embodiment of the disclosure.
Figure 2:
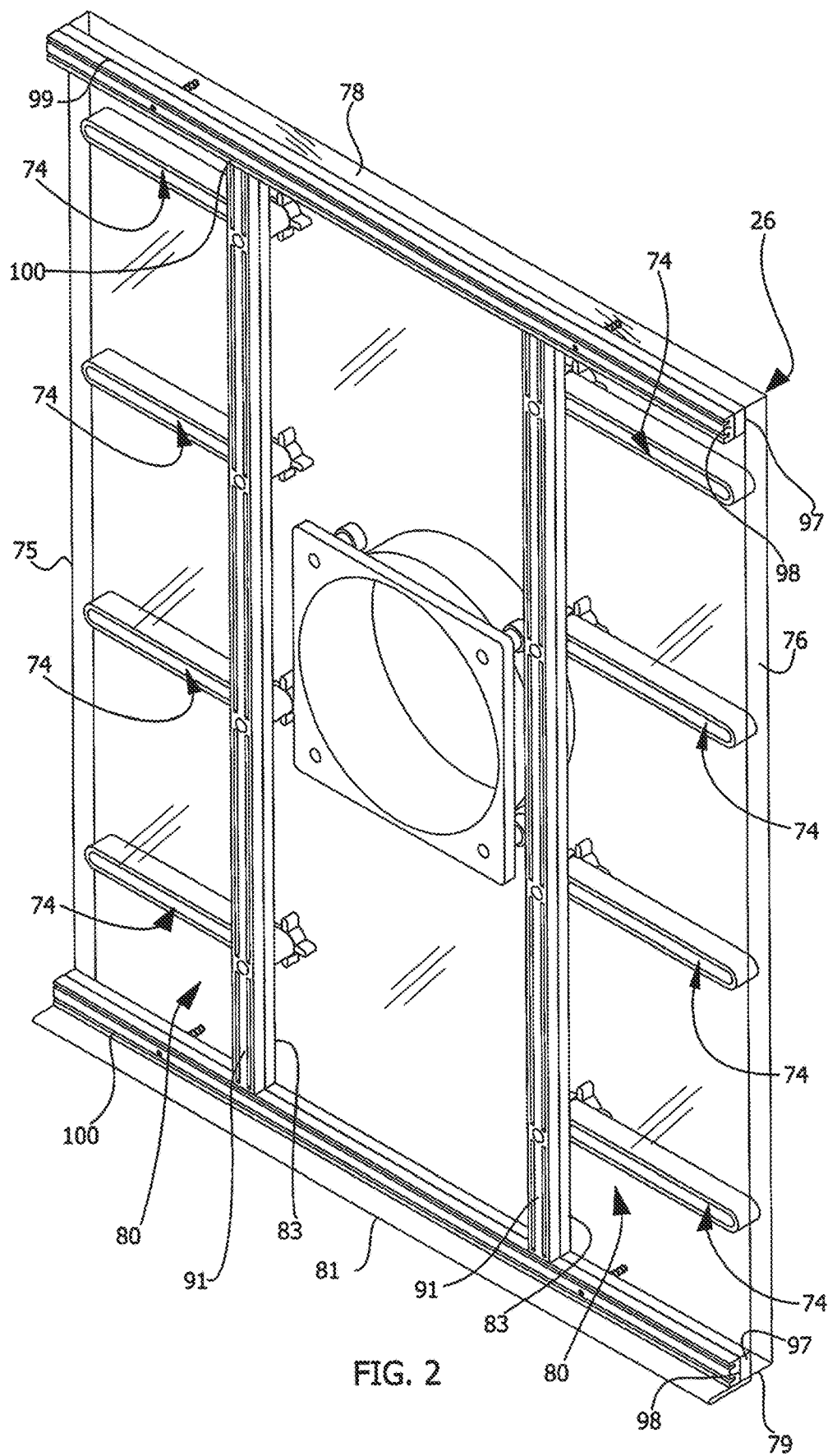
FIG. 2 is a back perspective view of an apartment intake cover of an embodiment of the disclosure.
Figure 3:
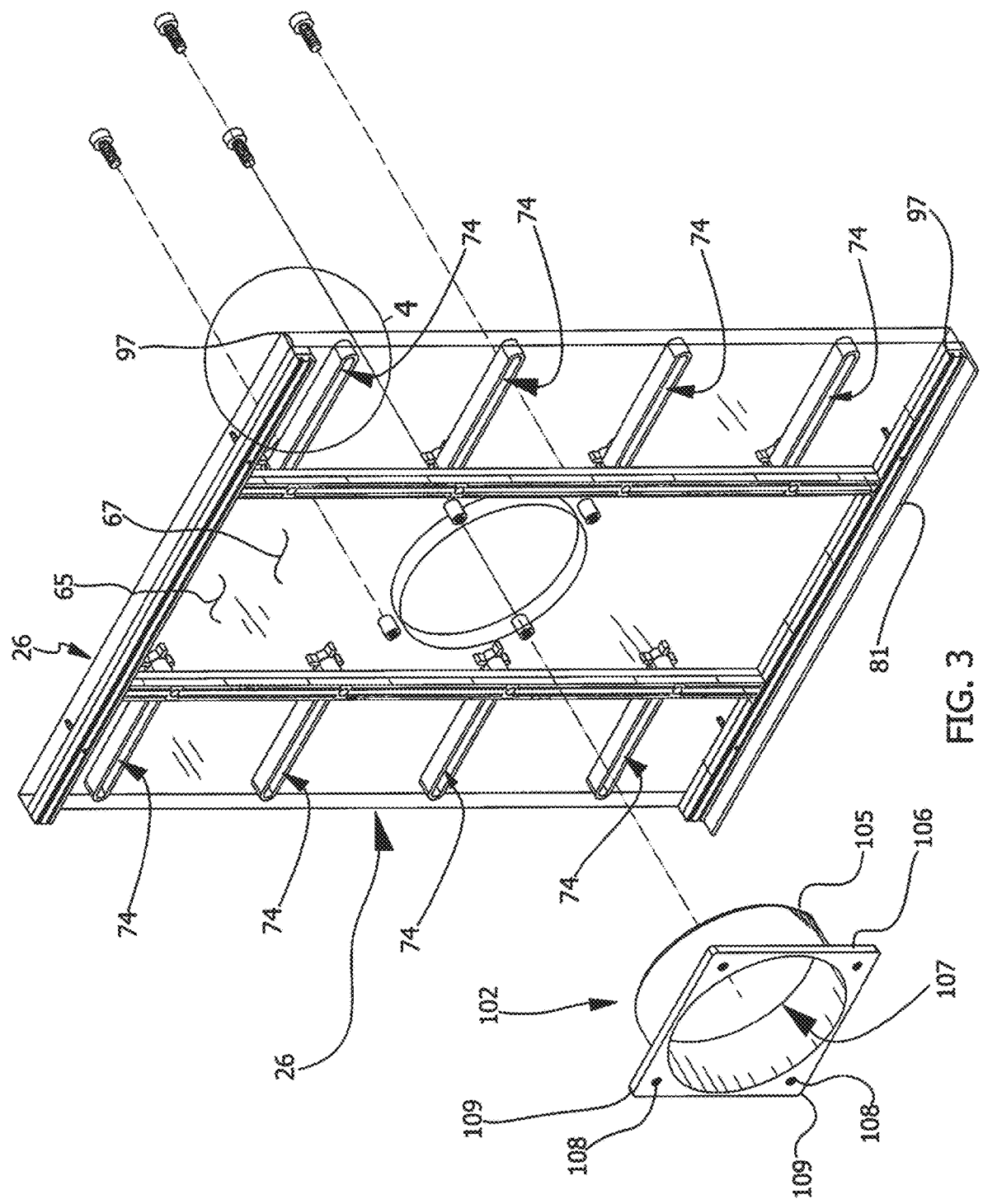
FIG. 3 is an exploded perspective view of apartment intake cover of an embodiment of the disclosure.
Figure 4:
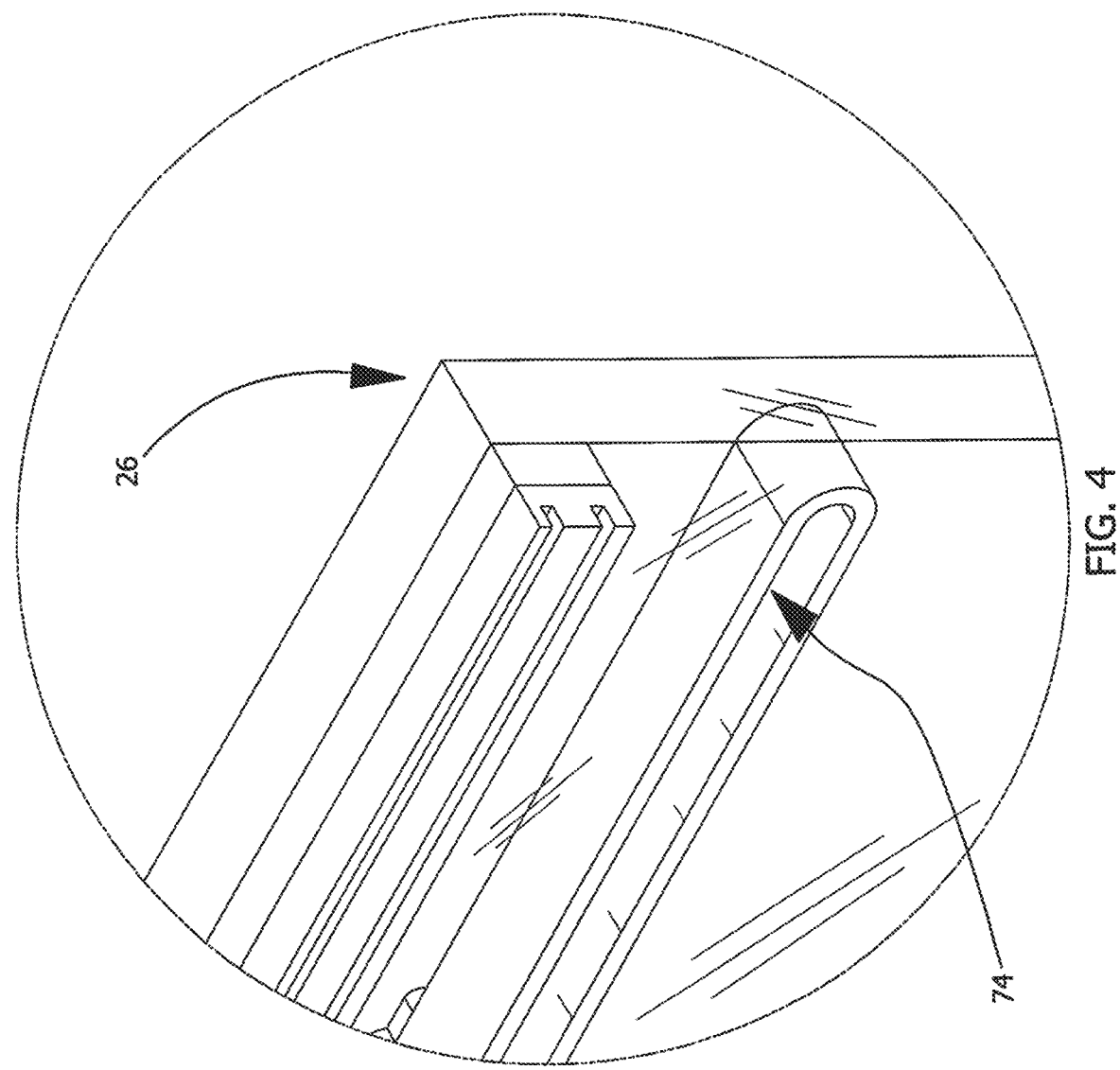
FIG. 4 is a magnified detail view taken from circle 4 of FIG. 3 of an embodiment of the disclosure.
Figure 5:
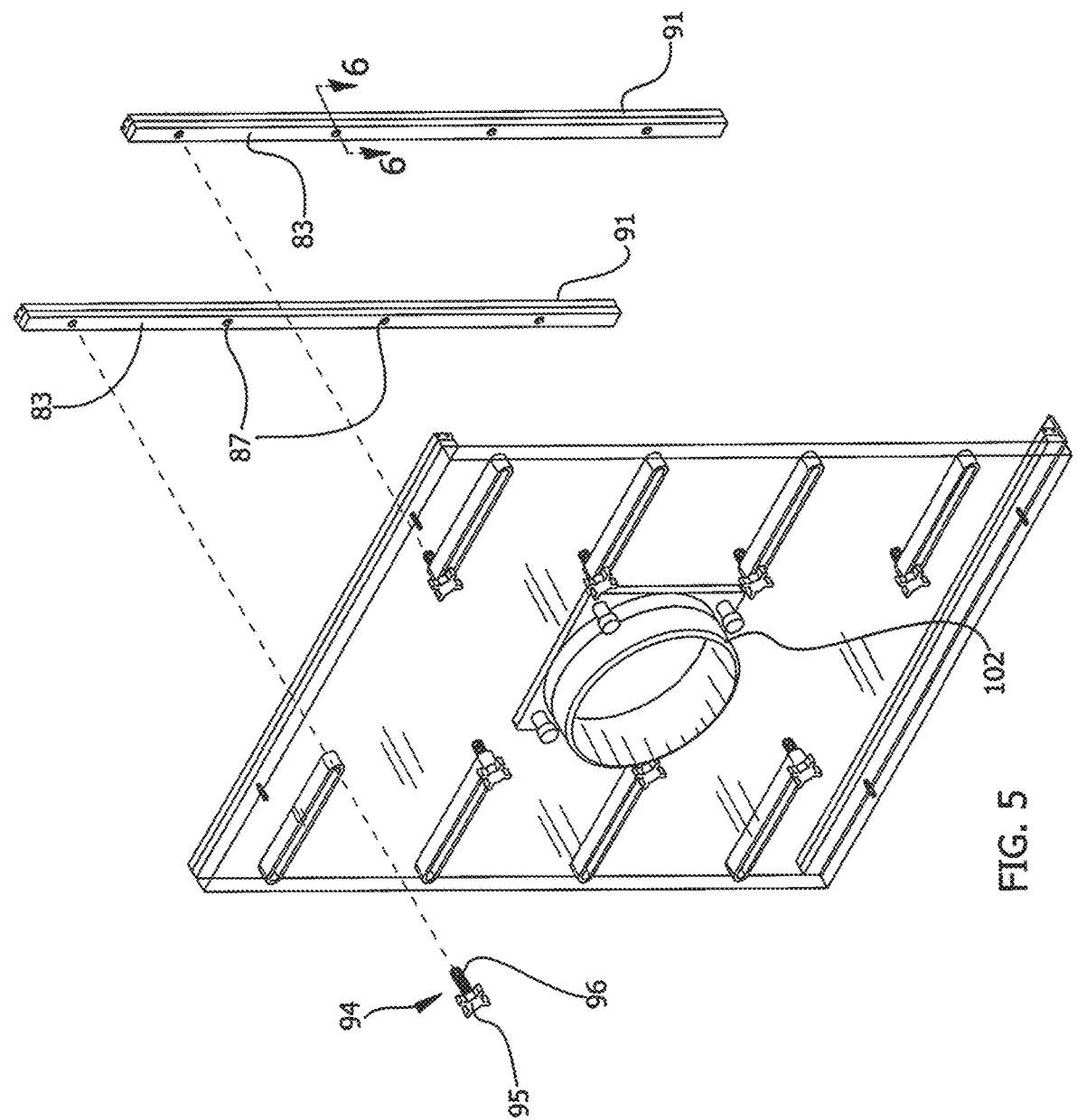
FIG. 5 is an exploded front perspective view of an apartment intake cover of an embodiment of the disclosure.
Figure 6:
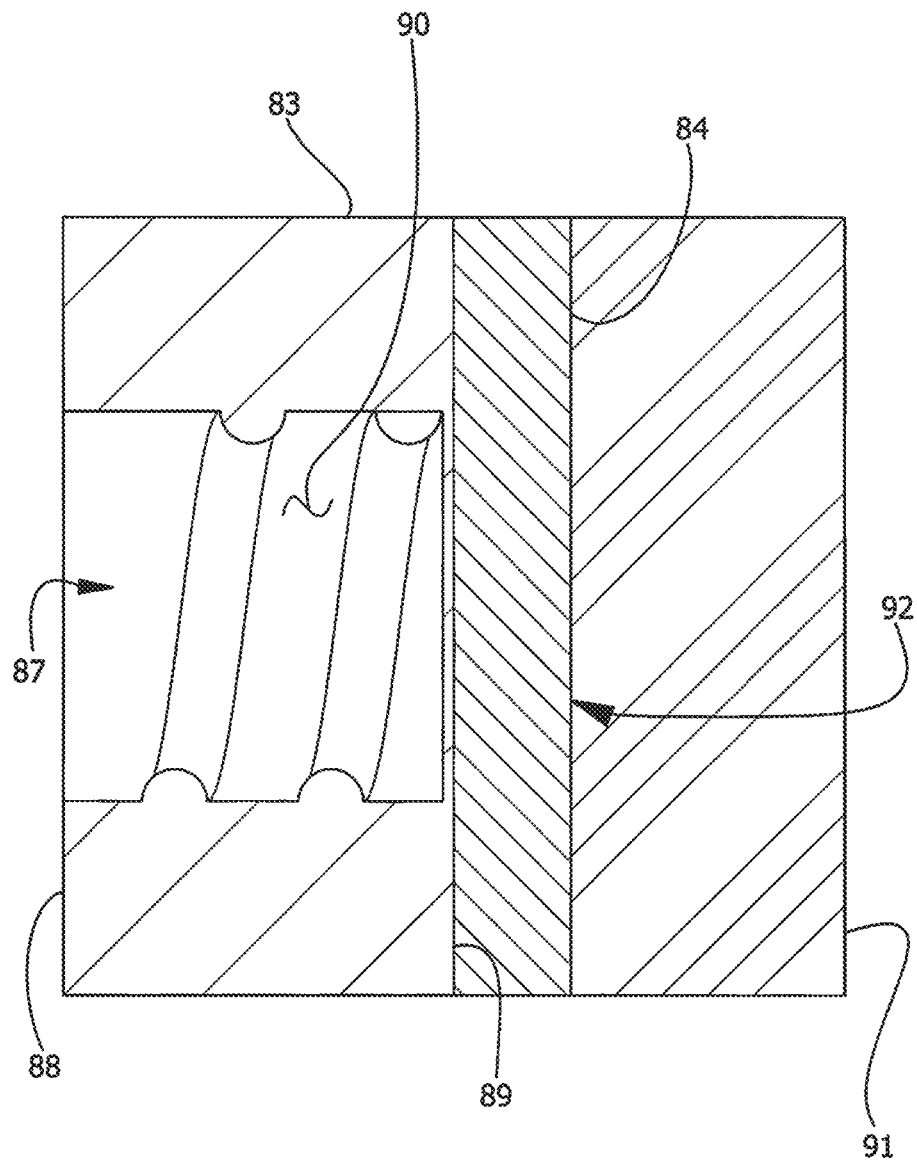
FIG. 6 is a cross sectional view taken along line 6-6 of FIG. 5 of an embodiment of the disclosure.
Figure 7:
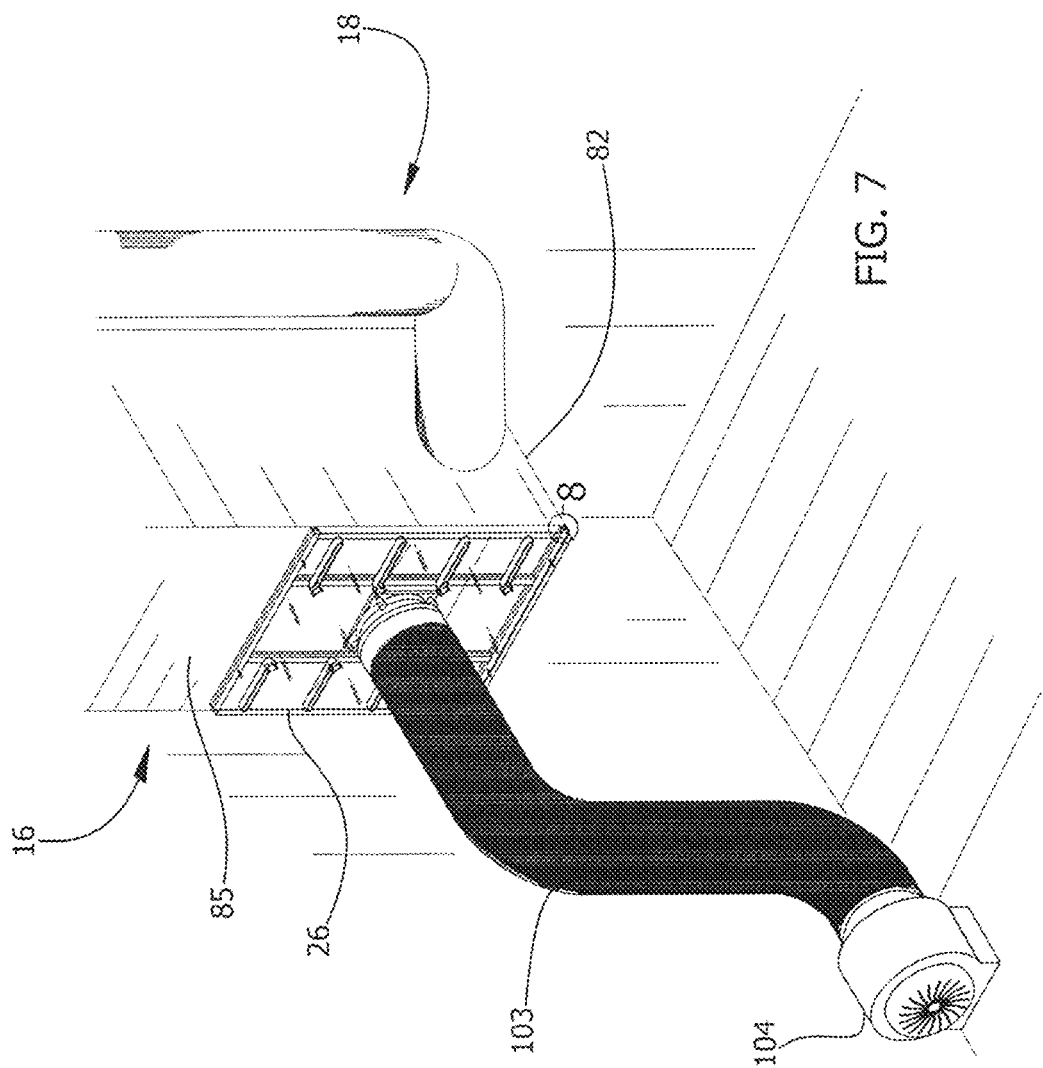
FIG. 7 is a perspective in-use view of an embodiment of the disclosure showing an apartment intake cover being fitted to an apartment air handler.
Figure 8:
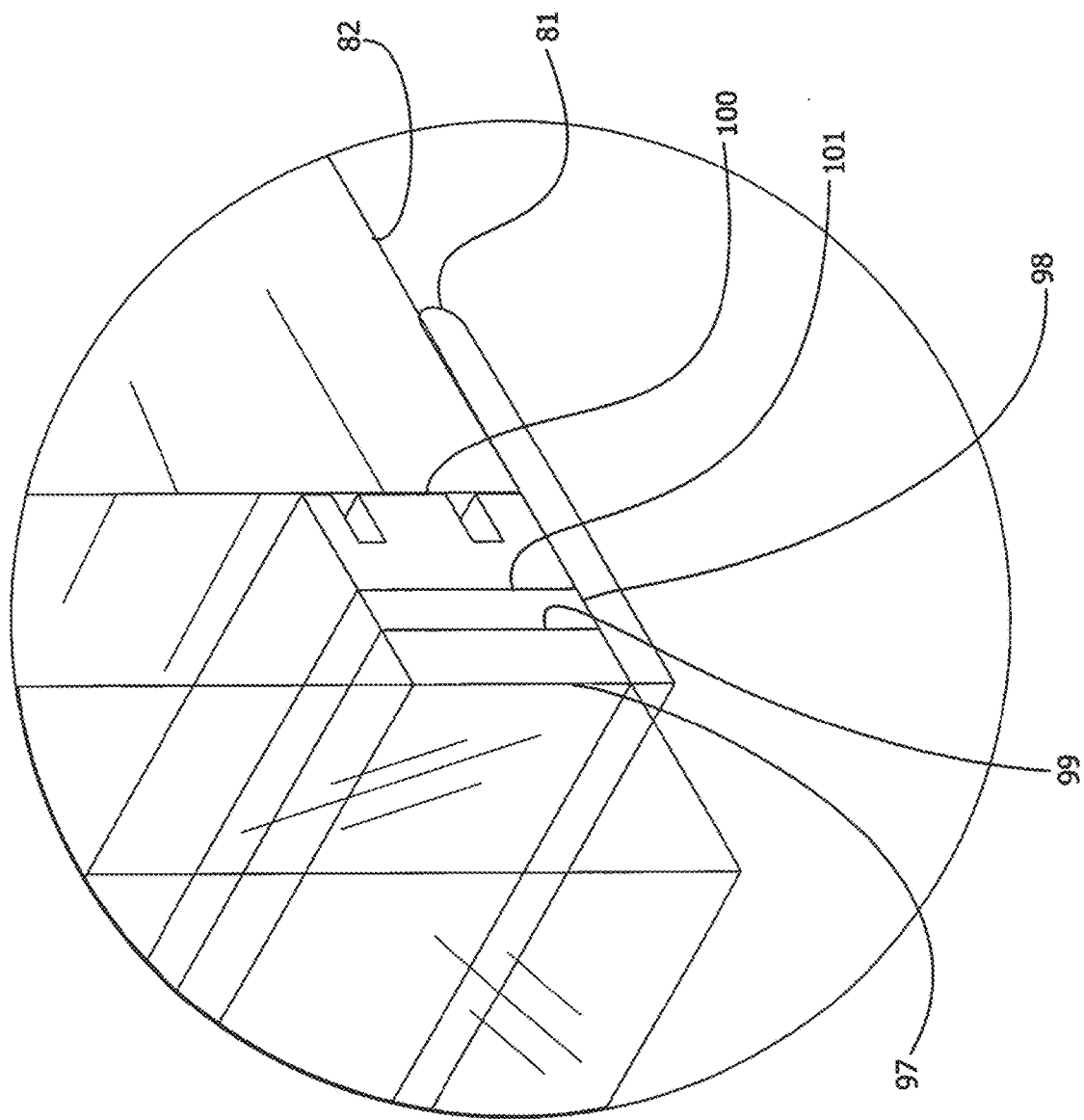
FIG. 8 is a magnified detail view taken from circle 8 of FIG. 7 of an embodiment of the disclosure.
Figure 9:
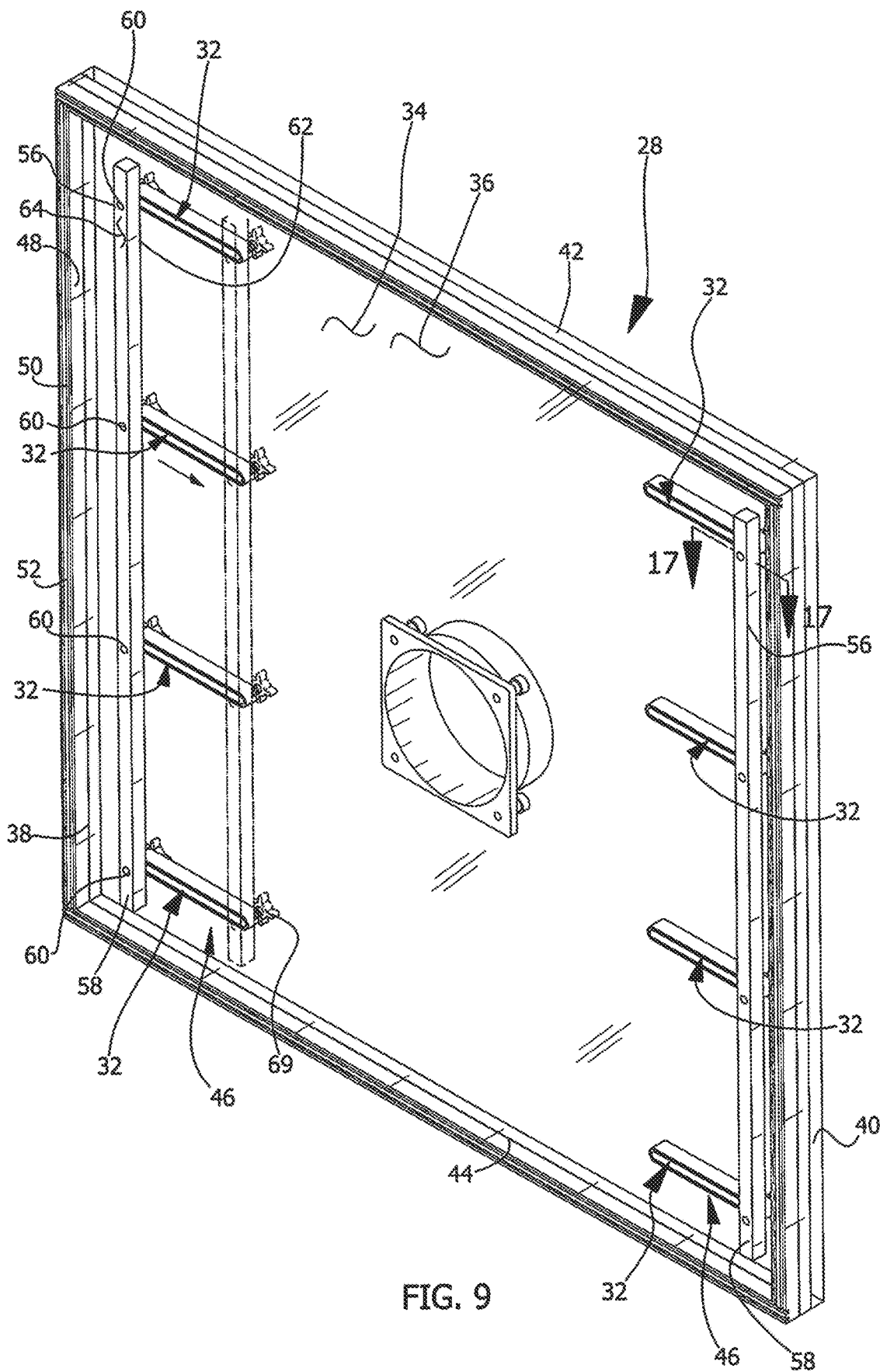
FIG. 9 is a back perspective view of first intake cover of an embodiment of the disclosure.
Figure 10:
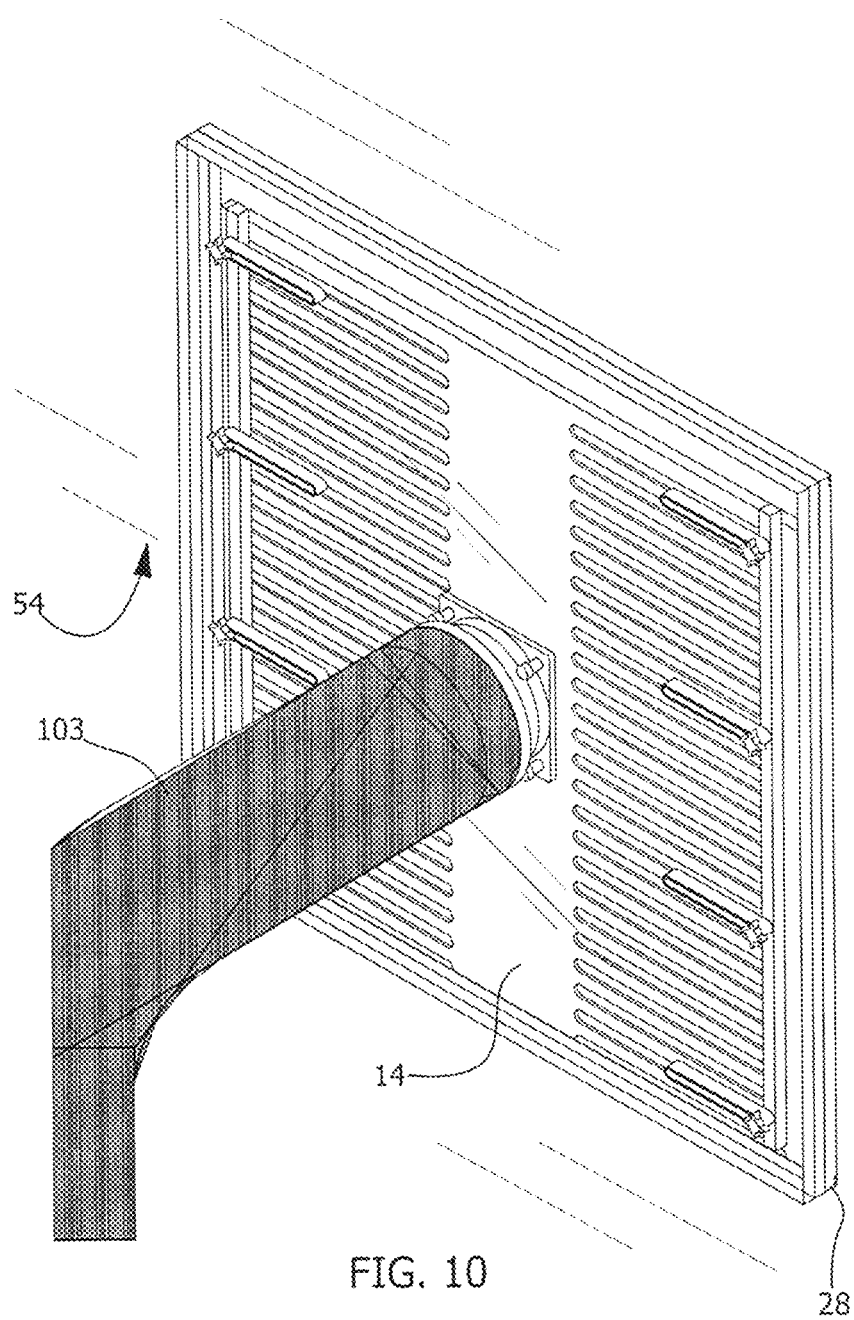
FIG. 10 is a perspective view of an embodiment of the disclosure showing a first intake cover being fitted to an air intake.
Figure 17:
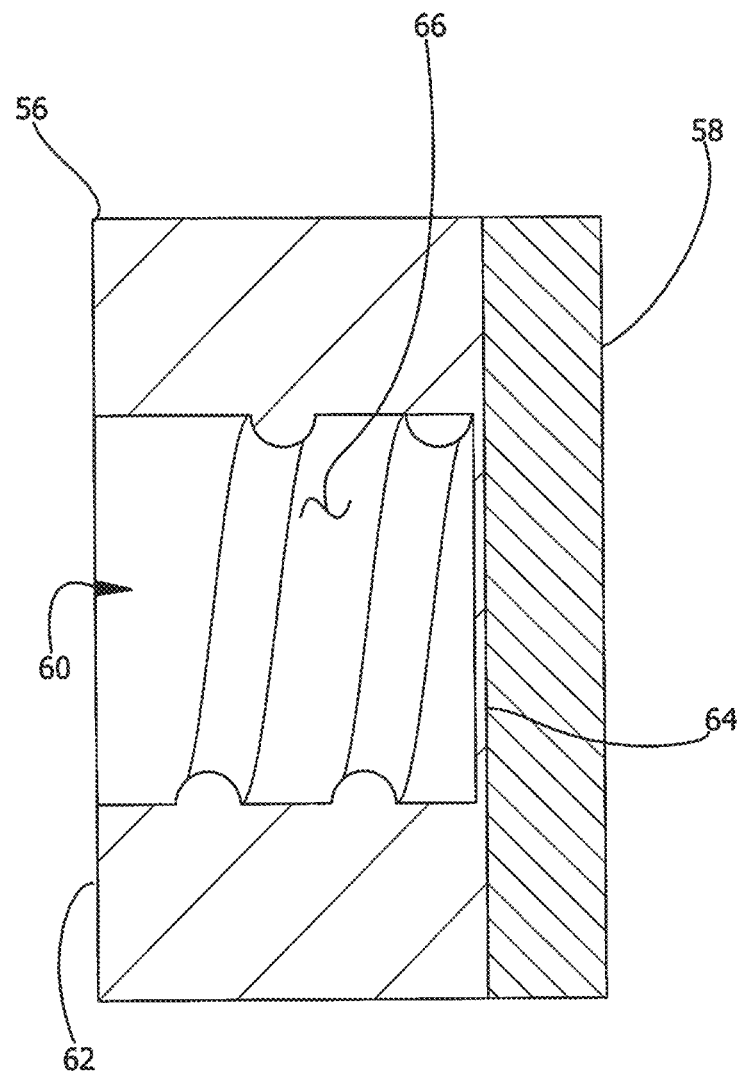

FIG. 17 is a cross sectional view taken along line 17-17 of FIG. 9 of an embodiment of the disclosure.

DETAILED DESCRIPTION OF THE INVENTION

With reference now to the drawings, and in particular to FIGS. 1 through 17 thereof, a new leakage testing device embodying the principles and concepts of an embodiment of the disclosure and generally designated by the reference numeral 10 will be described.

As best illustrated in FIGS. 1 through 17, the forced air leakage testing assembly 10 generally comprises a plurality of intake covers 12 that is manufactured with unique structural dimensions with respect to each other. In this way each of the plurality of intake covers 12 can be fitted over an air intake 14 of a respective type of air handler 16 of a forced air heating and cooling system 18. The forced air heating and cooling system 18 may be a residential heating and cooling system commonly found in homes and apartment complexes. Each of the intake covers 12 has an air hole 20 to pass air through the air hole 20 and the air hole 20 associated with each of the plurality of intake covers 12 is centrally located on a respective intake cover 12. Additionally, each of the plurality of intake covers 12 has a plurality of fastener holes 22 is evenly distributed around the air hole 20 associated with a respective intake cover 12. Each of the plurality of intake covers 12 is comprised of a fluid impermeable material, including but not being limited to plastic metal, to inhibit air from passing through the intake covers 12.

The plurality of intake covers 12 includes a pair of house intake covers 24 and an apartment intake cover 26 and the pair of house intake covers 24 includes a first intake cover 28 and a second intake cover 30. The first intake cover 28 has a plurality of first mounting slots 32 each extending through a front surface 34 and a back surface 36 of the first intake cover 28. Each of the plurality of first mounting slots 32 is elongated along an axis extending between a first lateral edge 38 and a second lateral edge 40 of the first intake cover 28 and the plurality of first mounting slots 32 is evenly spaced apart from each other and is distributed between a top edge 42 and a bottom edge 44 of the first intake cover 28. Furthermore, the plurality of first mounting slots 32 is arranged in a pair of columns 46 each positioned between the air hole 20 associated with the first intake cover 28 and a respective one of the first lateral edge 38 and the second lateral edge 40 of the first intake cover 28.

The first intake cover 28 has a border 48 extending away from the back surface 36 of the first intake cover 28 and the border 48 extends around a full perimeter of the first intake cover 28. The border 48 has a distal face 50 with respect to the back surface 36 of the first intake cover 28 and a border gasket 52 is attached to the distal face of the border 48 associated with the first intake cover 28. The border gasket 52 extends along a full length of the border 48 such that the border gasket 52 abuts a wall 54 in which the air intake 14 is integrated when the first intake cover 28 is positioned over the air intake 14. The border gasket 52 is comprised of a resiliently compressible material, including but not being limited to rubber or silicone, to form a fluid impermeable seal with the wall 54 to inhibit air from passing between the border gasket 52 and the wall 54. The first intake cover may have a height and a width of approximately 71.0 cm.

A pair of first rails 56 is provided and each of the first rails 56 is removably attachable to the first intake cover 28. Each of the first rails 56 has a magnet 58 extending along a full length of the first rails 56 such that the magnet 58 associated with each of the first rails 56 can magnetically engage the air intake 14 over which the first intake cover 28 is positioned for retaining the first intake cover 28 over the air intake 14. Each of the first rails 56 has a plurality of first fastener holes 60 extending through a forward surface 62 and a rearward surface 64 of the first rails 56 and each of the first fastener holes 60 has a bounding surface 66 that is threaded. Each of the first fastener holes 60 in each of the first rails 56 is aligned with a respective one of the plurality of first mounting slots 32 in a respective one of the columns 46 associated with the first intake cover 28 and the magnet 58 associated with each of the first rails 56 is positioned on the rearward surface 64 of a respective first rail 56.

A plurality of first fasteners 68 is provided and each of the first fasteners 68 includes a knob 69 and a screw 70 extending away from the knob 69. The screw 70 associated with each of the first fasteners 68 is extendable through a respective one of the plurality of first mounting slots 32 associated with the first intake cover 28 and into a respective one of the first fastener holes 60 in a respective one of the first rails 56. The screw 70 associated with each of the first fasteners 68 threadably engages the bounding surface 66 of the respective first fastener hole 60 for attaching the pair of first rails 56 to the first intake cover 28. Each of the pair of first rails 56 is positionable at a selected point along each of the plurality of first mounting slots 32 associated with a respective one of the columns 46 of first mounting slots 32 associated with the first intake cover 28 to accommodate air vents of varying dimensions.

The second intake cover 30 has an air gasket 71 that is attached to a rearward surface 72 of the second intake cover 30. The air gasket 71 extends around a full perimeter of the rearward surface 72 of the second intake cover 30. In this way the air gasket 71 can abut a wall 54 in which the air intake 14 is integrated when the second intake cover 30 is positioned over the air intake 14. The air gasket 71 is comprised of a resiliently compressible material, including but not being limited to rubber or silicone, to form a fluid impermeable seal with the wall 54 to inhibit air from passing between the air gasket 71 and the wall 54. The second intake cover 30 has a plurality of magnets 73 that is each attached to the rearward surface 72 of the second intake cover 30. In this way each of the magnets 73 associated with the second intake cover 30 can magnetically engage the air intake 14 over which the second intake cover 30 is positioned for retaining the second intake cover 30 over the air intake 14. The second intake cover 30 may have a height of approximately 40.0 cm and a width of approximately 89.0 cm.

The apartment intake cover 26 has a plurality of second mounting slots 74 each extending through a front surface 65 and a back surface 67 of the apartment intake cover 26. Each of the plurality of second mounting slots 74 is elongated along an axis extending between a first lateral edge 75 and a second lateral edge 76 of the apartment intake cover 26 and the plurality of second mounting slots 74 is evenly spaced apart from each other and is distributed between a top edge 78 and a bottom edge 79 of the apartment intake cover 26. The plurality of second mounting slots 74 is arranged in a pair of columns 80 each being positioned between the air hole 20 associated with the apartment intake cover 26 and a respective one of the first lateral edge 75 and the second lateral edge 76 of the apartment intake cover 26. The apartment intake cover 26 has a lip 81 extending away from the rearward surface of the apartment intake cover 26. The lip 81 is aligned with and extends along a full length of the bottom edge 79 of the apartment intake cover 26 such that the lip 81 can be positioned beneath a bottom of an apartment air handler 82 to facilitate aligning the apartment intake cover 26 on the apartment air handler 82. The apartment intake cover 26 may have a width of approximately 56.0 cm and a height of approximately 61.0 cm.

A pair of second rails 83 is removably attachable to the apartment intake cover 26 and each of the second rails 83 has a magnet 84 extending along a full length of the second rails 83. The magnet 84 associated with each of the second rails 83 can magnetically engage a body 85 of the apartment air handler 82 upon which the apartment intake cover 26 is positioned for retaining the apartment intake cover 26 over an air intake 86 in the apartment air handler 82. Each of the second rails 83 has a plurality of second fastener holes 87 extending through a forward surface 88 and a rearward surface 89 of the second rails 83 and each of the second fastener holes 87 has a bounding surface 90 that is threaded. Each of the second fastener holes 87 in each of the second rails 83 is aligned with a respective one of the plurality of second mounting slots 74 in a respective one of the columns 80 associated with the apartment intake cover 26. Additionally, the magnet 84 associated with each of the second rails 83 is positioned on the rearward surface 89 of a respective second rail 83.

A pair of second rail gaskets 91 is each attached to an exposed surface 92 of a respective one of the magnets 84 associated with the pair of second rails 83. In this way each of the second rail gaskets 91 can abut the body 85 of the apartment air handler 82 when the apartment intake cover 26 is positioned against the apartment air handler 82. Each of the second rail gaskets 91 is comprised of a resiliently compressible material, including but not being limited to rubber or silicone, for forming a fluid impermeable seal with the apartment air handler 82 to inhibit air from passing between the apartment air handler 82 and the second rail gaskets 91.

A plurality of second fasteners 94 is included and each of the second fasteners 94 includes a knob 95 and a screw 96 extending away from the knob 95. The screw 96 associated with each of the second fasteners 94 is extendable through a respective one of the plurality of second mounting slots 74 associated with the apartment intake cover 26 and into a respective one of the second fastener holes 87 in a respective one of the second rails 83. Additionally, the screw 96 associated with each of the second fasteners 94 threadably engages the bounding surface 90 of the respective second fastener hole 87 for attaching the pair of second rails 83 to the apartment intake cover 26. Each of the pair of second rails 83 is positionable at a selected point along each of the plurality of second mounting slots 74 associated with a respective one of the columns 80 of second mounting slots 74 associated with the apartment intake cover 26. In this way the pair of second rails 83 can accommodate various air intake 14 locations on the apartment air handler 82.

A pair of mounting rails 97 is provided and each of the mounting rails 97 is removably attachable to the apartment intake cover 26. Each of the mounting rails 97 has a magnet 98 extending along a full length of the mounting rails 97 such that the magnet 98 associated with each of the mounting rails 97 can magnetically engage the body 85 of the apartment air handler 82 upon which the apartment intake cover 26 is positioned for retaining the apartment intake cover 26 over the air intake 14 in the apartment air handler 82. The magnet 98 associated with each of the mounting rails 97 is positioned on a rearward surface 99 of a respective mounting rail 97.

A pair of mounting rail gaskets 100 is provided and each of the mounting rail gaskets 100 is attached to an exposed surface 101 of a respective one of the magnets 98 associated with the pair of mounting rails 97. In this way each of the mounting rail gaskets 100 can abut the body 85 of the apartment air handler 82 when the apartment intake cover 26 is positioned against the apartment air handler 82. Each of the mounting rail gaskets 100 is comprised of a resiliently compressible material, including but not being limited to rubber or silicon, for forming a fluid impermeable seal with the apartment air handler 82 to inhibit air from passing between the apartment air handler 82 and the mounting rail gaskets 100.

A flange 102 is provided which is attachable to a respective one of the plurality of intake covers 12 having the flange 102 being aligned with the air hole 20 in the respective intake cover 12. The flange 102 is attachable to an exhaust hose 103 of a source of forced air 104 to direct forced air into the air intake 14 over which the respective intake cover 12 is positioned. The flange 102 has a tube 105 that is attached to a mounting plate 106 having the tube 105 being aligned with an air hole 107 in the mounting plate 106. The mounting plate 106 has a plurality of fastener holes 108 that each extends through the mounting plate 106 and each of the fastener holes 108 is aligned with a respective one of four corners 109 of the mounting plate 106. The tube 105 is insertable through the air hole 20 in a respective one of the intake covers 12 having each of the fastener holes 108 in the mounting plate 106 being aligned with a respective one of the plurality of fastener holes 22 in the respective intake cover 12.

A plurality of flange fasteners 110 is provided and each of the flange fasteners 110 is extendable through a respective one of the fastener holes 22 in a respective one of the intake covers 12 and a respective one of the fastener holes 108 in the mounting plate 106 of the flange 102. The flange fasteners 110 engage the mounting plate 106 for attaching the flange 102 to the respective intake cover 12. Each of the flange fasteners 110 may comprise a screw or other type of threaded fastener.

A plurality of register covers 111 is provided and each of the plurality of register covers 111 is comprised of a fluid impermeable material, including but not being limited to plastic or steel. Each of the plurality of register covers 111 can be positioned over a respective air register 112 thereby inhibiting air from flowing through the respective air register 112. The each of the plurality of register covers 111 has a forward wall 114 and a perimeter wall 115 extending away from the forward wall 114 and each of the plurality of register covers 111 has a depression 116 that is integrated into the forward wall 54.

A plurality of register magnets 117 is included and each of the register magnets 117 is coupled to a rear surface 118 of a basal wall 119 of the depression 116 in a respective one of the plurality of register covers 111. In this way the register magnet 117 on the respective register cover 111 can magnetically engage the respective air register 112 for retaining the respective register cover 111 on the air register 112. A plurality of register gaskets 120 is provided and each of the register gaskets 120 is coupled to a distal edge 121 of the perimeter wall 54 of a respective one of the register covers 111. In this way each of the plurality of register gaskets 120 can abut a wall 54 in which the respective air register 112 is integrated. Each of the plurality of register gaskets 120 is comprised of a resiliently compressible material, including but not being limited to rubber or silicone, to inhibit air from passing between the wall 54 and the respective register cover 111.

A balloon 122 is inflatable to seal a floor register 124 when the balloon 122 is inserted into the floor register 124 and inflated thereby inhibiting air from exiting the floor register 124. The balloon 122 has an inflation port 125 that is fluidly integrated into an outer wall 126 of the balloon 122. An air hose 127 is fluidly coupled to the inflation port 125 on the balloon 122 and an air connector 128 is fluidly coupled to a distal end 129 of the air hose 127. The air connector 128 can be fluidly coupled to a source of compressed air 130 for inflating the balloon 122. In an alternative embodiment 131 most clearly shown in FIG. 16, each of the second rails 83 has a depth of at least 7.5 cm and each of the mounting rails 97 has a depth of at least 7.5 cm for accommodating unique structural features of the apartment air handler 82.

In use, the flange 102 is fitted to the first intake cover 28 and the first intake cover 28 is positioned over the air intake 14 of the air handler 16 in a house. The first rails 56 are strategically positioned to magnetically engage the air handler 16 for retaining the first intake cover 28 in the intake 14 of the air handler 16. Each of the register covers 111 is positioned over a respective air register 112 and the balloon 122 is inflated in a floor register 124, if necessary, to seal the floor register 124. The exhaust hose 103 of the source of forced air 104 is attached to the flange 102 and such that air is blown into the forced air heating and cooling system 18 to facilitate testing for air leakage. The second intake cover 30 can be fitted over the intake 14 of the air handler 16 when the intake 14 of the air handler 16 is integrated into a wall 54 rather than in the air handler 16 itself. The apartment intake cover 26 can be fitted over the intake 86 of the apartment air handler 82 when the forced air heating and cooling system 18 is located in an apartment. Additionally, the second rails 83 are strategically located to magnetically engage the apartment air handler 16. In this way a leakage test can be performed on a forced air heating and cooling system 18 of any conventional design that might be found in either a house or an apartment without the need to employ cardboard cutouts and adhesive tape as the current method of performing a leakage test requires.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A forced air leakage testing assembly for testing air leakage in a forced air heating and cooling system of a building, said assembly comprising:
    a plurality of intake covers, each of said plurality of intake covers being manufactured with unique structural dimensions with respect to each other wherein each of said plurality of intake covers is configured to be fitted over an air intake of a respective type of air handler of a forced air heating and cooling system, each of said intake covers having an air hole wherein said air hole in each of said plurality of intake covers is configured to pass air through said air hole, said air hole associated with each of said plurality of intake covers being centrally located on a respective intake cover, each of said plurality of intake covers having a plurality of fastener holes being evenly distributed around said air hole associated with a respective intake cover, each of said plurality of intake covers being comprised of a fluid impermeable material wherein each of said plurality of intake covers is configured to inhibit air from passing through said intake covers;
    a pair of first rails, each of said first rails being removably attachable to a respective one of said plurality of intake covers, each of said first rails having a magnet extending along a full length of said first rails wherein said magnet associated with each of said first rails is configured to magnetically engage the air intake over which said respective intake cover is positioned for retaining said respective intake cover over the air intake;
    a pair of second rails, each of said second rails being removably attachable to a respective one of said plurality of intake covers, each of said second rails having a magnet extending along a full length of said second rails wherein said magnet associated with each of said second rails is configured to magnetically engage an body of an apartment air handler upon which said respective intake cover is positioned for retaining said respective intake cover over an air intake in the apartment air handler;
    a pair of mounting rails, each of said mounting rails being removably attachable to said apartment intake cover, each of said mounting rails having a magnet extending along a full length of said mounting rails wherein said magnet associated with each of said mounting rails is configured to magnetically engage a body of the apartment air handler upon which said apartment intake cover is positioned for retaining said apartment intake cover over the air intake in the apartment air handler;
    a flange being attachable to a respective one of said plurality of intake covers having said flange being aligned with said air hole in said respective intake cover, said flange being attachable to an exhaust hose of a source of forced air wherein said exhaust hose is configured to direct forced air into the air intake over which said respective intake cover is positioned for performing a leakage test on the forced air heating and cooling system;
    a plurality of register covers, each of said plurality of register covers being comprised of a fluid impermeable material wherein each of said plurality of register covers is configured to be positioned over a respective air register thereby inhibiting air from flowing through the respective air register; and
    a balloon being inflatable wherein said balloon is configured to seal a floor register when said balloon is inserted into the floor register and inflated thereby inhibiting air from exiting the floor register.

2. The assembly according to claim 1, wherein:
said plurality of intake covers includes a pair of house intake covers and an apartment intake cover;
said pair of house intake covers includes a first intake cover and a second intake cover;
said first intake cover has a plurality of first mounting slots each extending through a front surface and a back surface of said first intake cover, each of said plurality of first mounting slots being elongated along an axis extending between a first lateral edge and a second lateral edge of said first intake cover, said plurality of first mounting slots being evenly spaced apart from each other and being distributed between a top edge and a bottom edge of said first intake cover, said plurality of first mounting slots being arranged in a pair of columns each being positioned between said air hole associated with said first intake cover and a respective one of said first lateral edge and said second lateral edge of said first intake cover; and
said first intake cover has a border extending away from said back surface of said first intake cover, said border extending around a full perimeter of said first intake cover, said border having a distal face with respect to said back surface of said first intake cover.

3. The assembly according to claim 2, further comprising a border gasket being attached to said distal face of said border associated with said first intake cover such that said border gasket extends along a full length of said border wherein said border gasket is configured to abut a wall in which the air intake is integrated when said first intake cover is positioned over the air intake, said border gasket being comprised of a resiliently compressible material wherein said border gasket is configured to form a fluid impermeable seal with the wall to inhibit air from passing between said border gasket and the wall.

4. The assembly according to claim 2, wherein:
each of said first rails has a plurality of first fasteners holes extending through a forward surface and a rearward surface of said first rails, each of said first fastener holes having a bounding surface being threaded, each of said first fastener holes in each of said first rails being aligned with a respective one of said plurality of first mounting slots in a respective one of said columns associated with said first intake cover, said magnet associated with each of said first rails being positioned on said rearward surface of a respective first rail; and
said assembly includes a plurality of first fasteners, each of said first fasteners including a knob and a screw extending away from said knob, said screw associated with each of said first fasteners being extendable through a respective one of said plurality of first mounting slots associated with said first intake cover and into a respective one of said first fastener holes in a respective one of said first rails having said screw associated with each of said first fasteners threadably engaging said bounding surface of said respective first fastener hole for attaching said pair of first rails to said first intake cover, each of said pair of first rails being positionable at a selected point along each of said plurality of first mounting slots associated with a respective one of said columns of first mounting slots associated with said first intake cover wherein said pair of first rails is configured to accommodate air vents of varying dimensions.

5. The assembly according to claim 1, wherein:
said plurality of intake covers includes a pair of house intake covers and an apartment intake cover;
said pair of house intake covers includes a first intake cover and a second intake cover; and
said second intake cover has an air gasket being attached to a rearward surface of said second intake cover, said air gasket extending around a full perimeter of said rearward surface of said second intake cover wherein said air gasket is configured to abut a wall in which the air intake is integrated when said second intake cover is positioned over the air intake, said air gasket being comprised of a resiliently compressible material wherein said air gasket is configured to form a fluid impermeable seal with the wall to inhibit air from passing between said air gasket and the wall.

6. The assembly according to claim 5, wherein said second intake cover has a plurality of magnets each being attached to a rearward surface of said second intake cover wherein each of said magnets associated with said second intake cover are configured to magnetically engage the air intake over which said second intake cover is positioned for retaining said second intake cover over the air intake.

7. The assembly according to claim 1, wherein:
said plurality of intake covers includes a pair of house intake covers and an apartment intake cover;
said pair of house intake covers includes a first intake cover and a second intake cover;
said first intake cover has a plurality of first mounting slots each extending through a front surface and a back surface of said first intake cover; and
said apartment intake cover has a plurality of second mounting slots each extending through a front surface and a back surface of said apartment intake cover, each of said plurality of second mounting slots being elongated along an axis extending between a first lateral edge and a second lateral edge of said apartment intake cover, said plurality of second mounting slots being evenly spaced apart from each other and being distributed between a top edge and a bottom edge of said apartment intake cover, said plurality of second mounting slots being arranged in a pair of columns each being positioned between said air hole associated with said apartment intake cover and a respective one of said first lateral edge and said second lateral edge of said apartment intake cover; and
said apartment intake cover has a lip extending away from said back surface of said apartment intake cover, said lip being aligned with and extending along a full length of said bottom edge of said apartment intake cover wherein said lip is configured to be positioned beneath a bottom of an apartment air handler to facilitate aligning said apartment intake cover on the apartment air handler.

8. The assembly according to claim 7, wherein each of said second rails has a plurality of second fasteners holes extending through a forward surface and a rearward surface of said second rails, each of said second fastener holes having a bounding surface being threaded, each of said second fastener holes in each of said second rails being aligned with a respective one of said plurality of second mounting slots in a respective one of said columns associated with said apartment intake cover, said magnet associated with each of said second rails being positioned on said rearward surface of a respective second rail.

9. The assembly according to claim 8, further comprising:
said plurality of intake covers includes a pair of house intake covers and an apartment intake cover; and a pair of second rail gaskets, each of said second rail gaskets being attached to an exposed surface of a respective one of said magnets associated with said pair of second rails wherein each of said second rail gaskets is configured abut the body of the apartment air handler when said apartment intake cover is positioned against the apartment air handler, each of said second rail gaskets being comprised of a resiliently compressible material wherein each of said second rail gaskets is configured to form a fluid impermeable seal with the apartment air handler to inhibit air from passing between the apartment air handler and said second rail gaskets; and a plurality of second fasteners, each of said second fasteners including a knob and a screw extending away from said knob, said screw associated with each of said second fasteners being extendable through a respective one of said plurality of second mounting slots associated with said apartment intake cover and into a respective one of said second fastener holes in a respective one of said second rails having said screw associated with each of said second fasteners threadably engaging said bounding surface of said respective second fastener hole for attaching said pair of second rails to said apartment intake cover, each of said pair of second rails being positionable at a selected point along each of said plurality of second mounting slots associated with a respective one of said columns of second mounting slots associated with said apartment intake cover wherein said pair of second rails is configured to accommodate various air intake locations on the apartment air handler.

10. The assembly according to claim 1, wherein:

said plurality of intake covers includes an apartment intake cover; and a pair of mounting rail gaskets, each of said mounting rail gaskets being attached to an exposed surface of a respective one of said magnets associated with said pair of mounting rails wherein each of said mounting rail gaskets is configured abut the body of the apartment air handler when said apartment intake cover is positioned against the apartment air handler, each of said mounting rail gaskets being comprised of a resiliently compressible material wherein each of said mounting rail gaskets is configured to form a fluid impermeable seal with the apartment air handler to inhibit air from passing between the apartment air handler and said mounting rail gaskets.

11. The assembly according to claim 1, wherein said flange has a tube being attached to a mounting plate having said tube being aligned with an air hole in said mounting plate, said mounting plate having a plurality of fastener holes each extending through said mounting plate, each of said fastener holes being aligned with a respective one of four corners of said mounting plate, said tube being insertable through said air hole in a respective one of said intake covers having each of said fastener holes in said mounting plate being aligned with a respective one of said plurality of fastener holes in said respective intake cover.

12. The assembly according to claim 11, further comprising a plurality of flange fasteners, each of said flange fasteners being extendable through a respective one of said fastener holes in a respective one of said intake covers and a respective one of said fastener holes in said mounting plate of said flange having said flange fasteners engaging said mounting plate for attaching said flange to said respective intake cover.

13. The assembly according to claim 1, wherein:

said each of said plurality of register covers has a forward wall and a perimeter wall extending away from said forward wall of said register covers, each of said plurality of register covers having a depression being integrated into said forward wall of said register covers;

a plurality of register magnets, each of said register magnets being coupled to a rear surface of a basal wall of said depression in a respective one of said plurality of register covers wherein said register magnet on said respective register cover is configured to magnetically engage the respective air register for retaining said respective register cover on the air register; and a plurality of register gaskets, each of said register gaskets being coupled to a distal edge of said perimeter wall of a respective one of said register covers wherein each of said plurality of register gaskets is configured to abut a wall in which the respective air register is integrated, each of said plurality of register gaskets being comprised of a resiliently compressible material wherein each of said plurality of register gaskets is configured to inhibit air from passing between the wall and the respective register cover.

14. A forced air leakage testing assembly for testing air leakage in a forced air heating and cooling system of a building, said assembly comprising:

a plurality of intake covers, each of said plurality of intake covers being manufactured with unique structural dimensions with respect to each other wherein each of said plurality of intake covers is configured to be fitted over an air intake of a respective type of air handler of a forced air heating and cooling system, each of said intake covers having an air hole wherein said air hole in each of said plurality of intake covers is configured to pass air through said air hole, said air hole associated with each of said plurality of intake covers being centrally located on a respective intake cover, each of said plurality of intake covers having a plurality of fastener holes being evenly distributed around said air hole associated with a respective intake cover, each of said plurality of intake covers being comprised of a fluid impermeable material wherein each of said plurality of intake covers is configured to inhibit air from passing through said intake covers, said plurality of intake covers including a pair of house intake covers and an apartment intake cover, said pair of house intake covers including a first intake cover and a second intake cover, said first intake cover having a plurality of first mounting slots each extending through a front surface and a back surface of said first intake cover, each of said plurality of first mounting slots being elongated along an axis extending between a first lateral edge and a second lateral edge of said first intake cover, said plurality of first mounting slots being evenly spaced apart from each other and being distributed between a top edge and a bottom edge of said first intake cover, said plurality of first mounting slots being arranged in a pair of columns each being positioned between said air hole associated with said first intake cover and a respective one of said first lateral edge and said second lateral edge of said first intake cover, said first intake cover having a border extending away from said back surface of said first intake cover, said border extending around a full perimeter of said first intake cover, said border having a distal face with respect to said back surface of said first intake cover;

a border gasket being attached to said distal face of said border associated with said first intake cover such that said border gasket extends along a full length of said border wherein said border gasket is configured to abut a wall in which the air intake is integrated when said first intake cover is positioned over the air intake, said border gasket being comprised of a resiliently compressible material wherein said border gasket is configured to form a fluid impermeable seal with the wall to inhibit air from passing between said border gasket and the wall;

a pair of first rails, each of said first rails being removably attachable to said first intake cover, each of said first rails having a magnet extending along a full length of said first rails wherein said magnet associated with each of said first rails is configured to magnetically engage the air intake over which said first intake cover is positioned for retaining said first intake cover over the air intake, each of said first rails having a plurality of first fasteners holes extending through a forward surface and a rearward surface of said first rails, each of said first fastener holes having a bounding surface being threaded, each of said first fastener holes in each of said first rails being aligned with a respective one of said plurality of first mounting slots in a respective one of said columns associated with said first intake cover, said magnet associated with each of said first rails being positioned on said rearward surface of a respective first rail;

a plurality of first fasteners, each of said first fasteners including a knob and a screw extending away from said knob, said screw associated with each of said first fasteners being extendable through a respective one of said plurality of first mounting slots associated with said first intake cover and into a respective one of said first fastener holes in a respective one of said first rails having said screw associated with each of said first fasteners threadably engaging said bounding surface of said respective first fastener hole for attaching said pair of first rails to said first intake cover, each of said pair of first rails being positionable at a selected point along each of said plurality of first mounting slots associated with a respective one of said columns of first mounting slots associated with said first intake cover wherein said pair of first rails is configured to accommodate air vents of varying dimensions;

wherein said second intake cover has an air gasket being attached to a rearward surface of said second intake cover, said air gasket extending around a full perimeter of said rearward surface of said second intake cover wherein said air gasket is configured to abut a wall in which the air intake is integrated when said second intake cover is positioned over the air intake, said air gasket being comprised of a resiliently compressible material wherein said air gasket is configured to form a fluid impermeable seal with the wall to inhibit air from passing between said air gasket and the wall;

wherein said second intake cover has a plurality of magnets each being attached to said rearward surface of said second intake cover wherein each of said magnets associated with said second intake cover are configured to magnetically engage the air intake over which said second intake cover is positioned for retaining said second intake cover over the air intake;

wherein said apartment intake cover has a plurality of second mounting slots each extending through a front surface and a back surface of said apartment intake cover, each of said plurality of second mounting slots being elongated along an axis extending between a first lateral edge and a second lateral edge of said apartment intake cover, said plurality of second mounting slots being evenly spaced apart from each other and being distributed between a top edge and a bottom edge of said apartment intake cover, said plurality of second mounting slots being arranged in a pair of columns each being positioned between said air hole associated with said apartment intake cover and a respective one of said first lateral edge and said second lateral edge of said apartment intake cover, said apartment intake cover having a lip extending away from said back surface of said apartment intake cover, said lip being aligned with and extending along a full length of said bottom edge of said apartment intake cover wherein said lip is configured to be positioned beneath a bottom of an apartment air handler to facilitate aligning said apartment intake cover on the apartment air handler;

a pair of second rails, each of said second rails being removably attachable to said apartment intake cover, each of said second rails having a magnet extending along a full length of said second rails wherein said magnet associated with each of said second rails is configured to magnetically engage an body of an apartment air handler upon which said apartment intake cover is positioned for retaining said apartment intake cover over an air intake in the apartment air handler, each of said second rails having a plurality of second fasteners holes extending through a forward surface and a rearward surface of said second rails, each of said second fastener holes having a bounding surface being threaded, each of said second fastener holes in each of said second rails being aligned with a respective one of said plurality of second mounting slots in a respective one of said columns associated with said apartment intake cover, said magnet associated with each of said second rails being positioned on said rearward surface of a respective second rail;

a pair of second rail gaskets, each of said second rail gaskets being attached to an exposed surface of a respective one of said magnets associated with said pair of second rails wherein each of said second rail gaskets is configured abut the body of the apartment air handler when said apartment intake cover is positioned against the apartment air handler, each of said second rail gaskets being comprised of a resiliently compressible material wherein each of said second rail gaskets is configured to form a fluid impermeable seal with the apartment air handler to inhibit air from passing between the apartment air handler and said second rail gaskets;

a plurality of second fasteners, each of said second fasteners including a knob and a screw extending away from said knob, said screw associated with each of said second fasteners being extendable through a respective one of said plurality of second mounting slots associated with said apartment intake cover and into a respective one of said second fastener holes in a respective one of said second rails having said screw associated with each of said second fasteners threadably engaging said bounding surface of said respective second fastener hole for attaching said pair of second rails to said apartment intake cover, each of said pair of second rails being positionable at a selected point along each of said plurality of second mounting slots associated with a respective one of said columns of second mounting slots associated with said apartment intake cover wherein said pair of second rails is configured to accommodate various air intake locations on the apartment air handler;

a pair of mounting rails, each of said mounting rails being removably attachable to said apartment intake cover, each of said mounting rails having a magnet extending along a full length of said mounting rails wherein said magnet associated with each of said mounting rails is configured to magnetically engage an body of the apartment air handler upon which said apartment intake cover is positioned for retaining said apartment intake cover over the air intake in the apartment air handler, said magnet associated with each of said mounting rails being positioned on said rearward surface of a respective mounting rail;

a pair of mounting rail gaskets, each of said mounting rail gaskets being attached to an exposed surface of a respective one of said magnets associated with said pair of mounting rails wherein each of said mounting rail gaskets is configured abut the body of the apartment air handler when said apartment intake cover is positioned against the apartment air handler, each of said mounting rail gaskets being comprised of a resiliently compressible material wherein each of said mounting rail gaskets is configured to form a fluid impermeable seal with the apartment air handler to inhibit air from passing between the apartment air handler and said mounting rail gaskets;

a flange being attachable to a respective one of said plurality of intake covers having said flange being aligned with said air hole in said respective intake cover, said flange being attachable to an exhaust hose of a source of forced air wherein said exhaust hose is configured to direct forced air into the air intake over which said respective intake cover is positioned for performing a leakage test on the forced air heating and cooling system, said flange having a tube being attached to a mounting plate having said tube being aligned with an air hole in said mounting plate, said mounting plate having a plurality of fastener holes each extending through said mounting plate, each of said fastener holes being aligned with a respective one of four corners of said mounting plate, said tube being insertable through said air hole in a respective one of said intake covers having each of said fastener holes in said mounting plate being aligned with a respective one of said plurality of fastener holes in said respective intake cover;

a plurality of flange fasteners, each of said flange fasteners being extendable through a respective one of said fastener holes in a respective one of said intake covers and a respective one of said fastener holes in said mounting plate of said flange having said flange fasteners engaging said mounting plate for attaching said flange to said respective intake cover;

a plurality of register covers, each of said plurality of register covers being comprised of a fluid impermeable material wherein each of said plurality of register covers is configured to be positioned over a respective air register thereby inhibiting air from flowing through the respective air register, said each of said plurality of register covers having a forward wall and a perimeter wall extending away from said forward wall of said register covers, each of said plurality of register covers having a depression being integrated into said forward wall of said register covers;

a plurality of register magnets, each of said register magnets being coupled to a rear surface of a basal wall of said depression in a respective one of said plurality of register covers wherein said register magnet on said respective register cover is configured to magnetically engage the respective air register for retaining said respective register cover on the air register;

a plurality of register gaskets, each of said register gaskets being coupled to a distal edge of said perimeter wall of a respective one of said register covers wherein each of said plurality of register gaskets is configured to abut a wall in which the respective air register is integrated, each of said plurality of register gaskets being comprised of a resiliently compressible material wherein each of said plurality of register gaskets is configured to inhibit air from passing between the wall and the respective register cover;

a balloon being inflatable wherein said balloon is configured to seal a floor register when said balloon is inserted into the floor register and inflated thereby inhibiting air from exiting the floor register, said balloon having an inflation port being fluidly integrated into an outer wall of said balloon;

an air hose being fluidly coupled to said inflation port on said balloon; and an air connector being fluidly coupled to a distal end of said air hose wherein said air connector is configured to be fluidly coupled to a source of compressed air for inflating said balloon.

\* \* \* \* \*